(12) United States Patent
Senge

(10) Patent No.: US 6,546,683 B1
(45) Date of Patent: Apr. 15, 2003

(54) WINDOW UNIT FOR MOUNTING IN A PREDEFINED OPENING OF MOTOR VEHICLES AND SUCH LIKE

(75) Inventor: Christoph Senge, Dillingen-Diefflen (DE)

(73) Assignee: Richard Fritz GmbH & Co. KG, Besigheim (DE)

(*) Notice: Subject to any disclaimer, the term of this patent is extended or adjusted under 35 U.S.C. 154(b) by 0 days.

(21) Appl. No.: 09/622,010
(22) PCT Filed: Apr. 19, 1999
(86) PCT No.: PCT/EP99/02615
§ 371 (c)(1), (2), (4) Date: Aug. 11, 2000
(87) PCT Pub. No.: WO99/55547
PCT Pub. Date: Nov. 4, 1999

(30) Foreign Application Priority Data

Apr. 23, 1998 (DE) .......................... 198 18 153

(51) Int. Cl.⁷ ................................ E06B 3/00
(52) U.S. Cl. .................... 52/208; 52/204.591
(58) Field of Search .............. 52/208, 204.591, 52/204.597, 716.6, 716.7; 296/96.21, 201

(56) References Cited

U.S. PATENT DOCUMENTS

| | | | |
|---|---|---|---|
| 2,612,972 A | * 10/1952 | Heimgartner et al. | |
| 2,655,239 A | 10/1953 | Kenlock | ........... 189/78 |
| 3,766,697 A | * 10/1973 | Jackson | |
| 3,968,613 A | * 7/1976 | Meyer | |
| 4,011,635 A | * 3/1977 | Meyer | |
| 4,043,579 A | * 8/1977 | Meyer | |
| 4,775,570 A | 10/1988 | Ohlenforst et al. | ........... 428/83 |
| 4,974,901 A | * 12/1990 | Katayama | |
| 4,984,839 A | 1/1991 | Miyakawa et al. | ........... 296/93 |
| 5,624,148 A | * 4/1997 | Young et al. | |
| 5,669,131 A | * 9/1997 | Gold | |

FOREIGN PATENT DOCUMENTS

DE       945 675       7/1956
FR       2 340 217       9/1977

* cited by examiner

*Primary Examiner*—Blair M. Johnson
(74) *Attorney, Agent, or Firm*—Foley & Lardner

(57) ABSTRACT

The window unit (20) has a window (21) and a frame (22) which is integrally formed on the window (21). Retaining devices (24) for retaining add-on parts (23) are provided at a plurality of peripheral locations of the frame (22). Each retaining device (24) is formed by a retaining strip (28) and a retaining clip (29). The retaining strip (28) is arranged on the outside of the frame (22) and permanently bonded thereto, for example partially formed therein. The retaining clips (29) have an elongate basic body, on the two longitudinal sides of which both retaining wings and latching wings are provided. The retaining wings serve for releasably anchoring the retaining clips (29) on the retaining strips (28). The latching wings serve for releasably connecting the add-on part (28) [sic] to the frame (22).

7 Claims, 5 Drawing Sheets

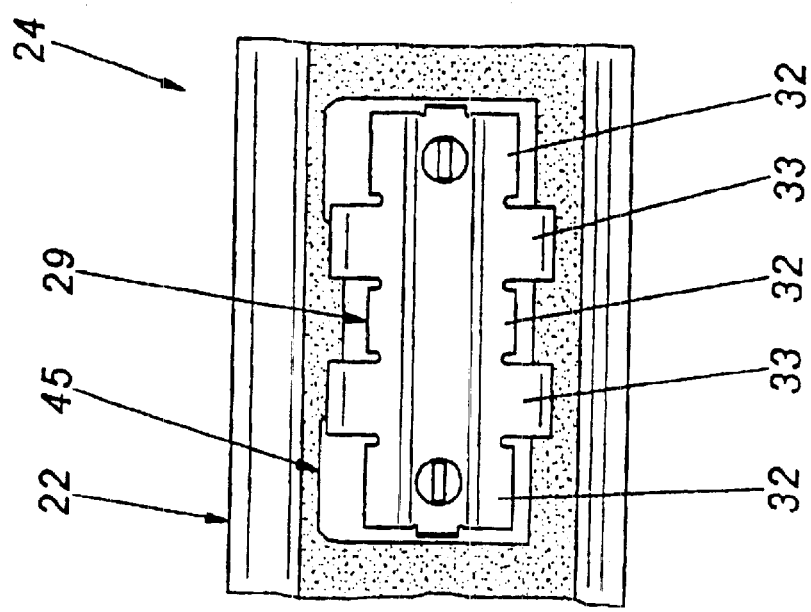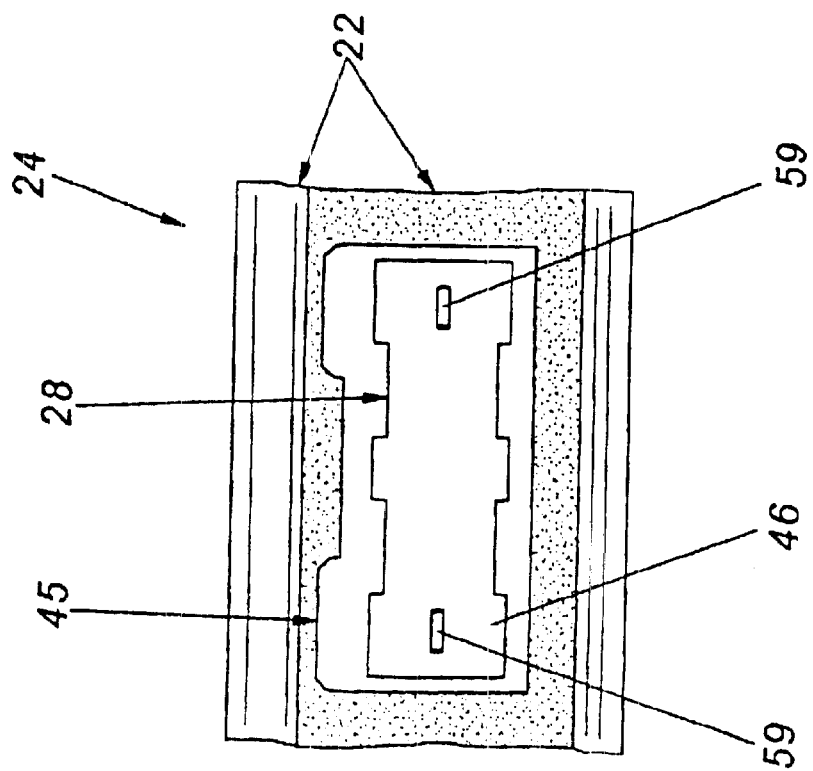

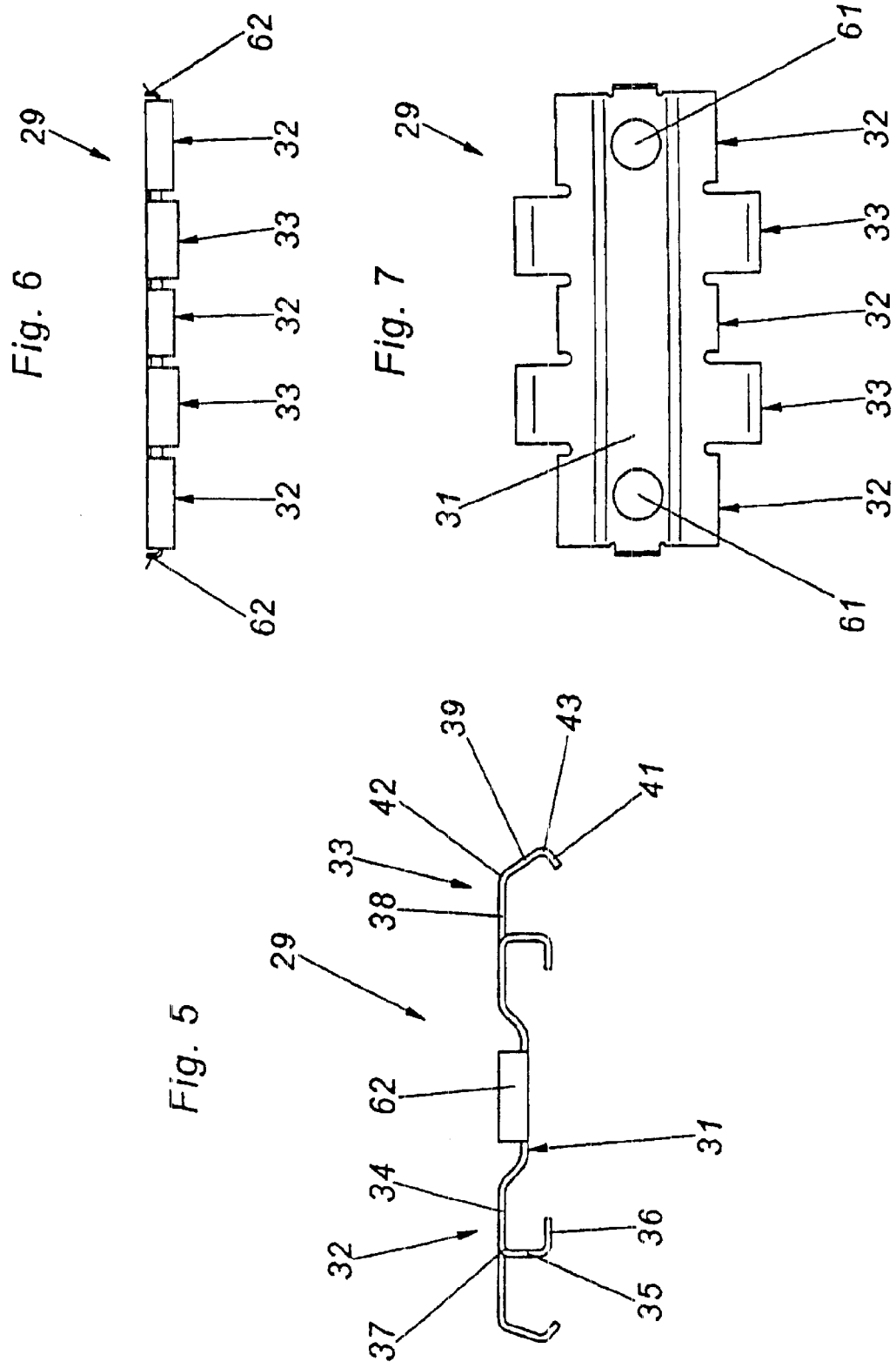

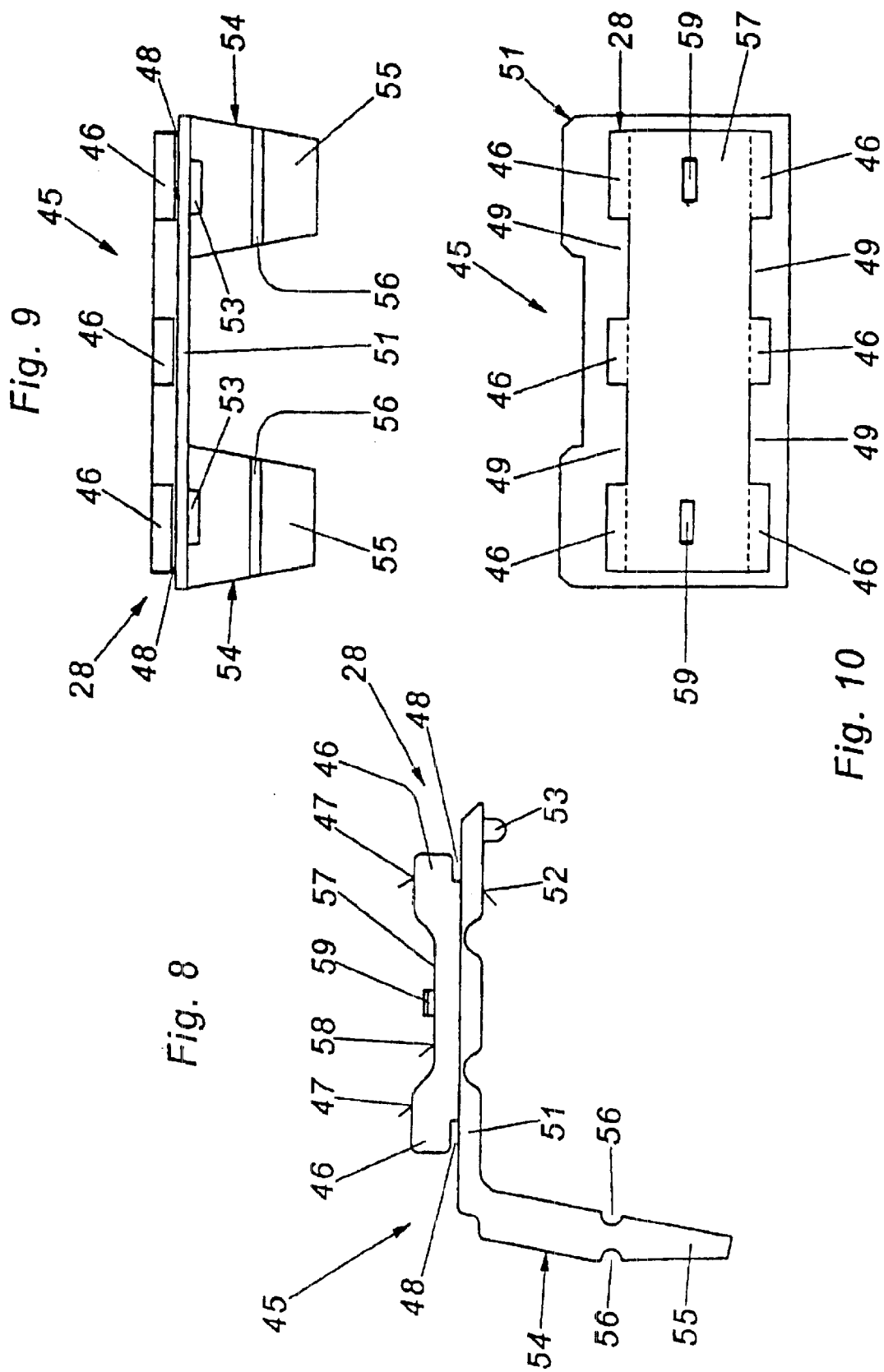

WINDOW UNIT FOR MOUNTING IN A PREDEFINED OPENING OF MOTOR VEHICLES AND SUCH LIKE

In window units which are intended for inserting into a predefined opening of motor vehicles and such like and have a window and a peripheral frame integrally formed thereon, it is sometimes the case that add-on parts, for example trim strips and such like, are fitted on the frame. Provided for this purpose on the relevant length section of the frame are a number of retaining devices by way of which the add-on parts are releasably connected, i.e. generally latched in by means of corresponding moldings in the manner of a snap-action closure.

Since the frame is in the form of an injection molding and is produced from more or less compliant material, the add-on part is not connected to the frame directly. In order to improve the latching connection, in the case of the retaining devices, use is made of a metal retaining clips [sic] which is positioned on a retaining strip on the frame, which, for its part, is integrally formed on the frame.

The retaining clips have an elongate, planar basic body, on the two longitudinal sides of which there are generally arranged two latching wings and three retaining wings, which follow one another alternately. The latching wings extend further outwards than the retaining wings and are designed such that, along with coordinated profile sections of the add-on part, they produce a latching connection.

The retaining wings have at least more or less a U-shaped vertical projection with legs of different lengths. The longer leg of the U-profile, which adjoins the basic body, forms a rear section, and the web part of the U-profile, as a side section, adjoins said rear section in the direction of the frame. The shorter leg of the U-profile is aligned inward, as a retaining section.

On the two remote sides, which run parallel to the longitudinal extent of the frame section, the retaining strips on the frame have in each case one retaining groove which is coordinated with the retaining section of the retaining wings. The retaining clip is pushed onto the retaining strip from the end side such that the retaining sections of the retaining wings thereof engage in the retaining grooves of the retaining strips. At a later stage, the add-on part is positioned on the retaining strips and pressed on until it has latched in on the latching wings.

On the retaining strips, the retaining grooves can only be produced with a very limited groove depth because it is necessary to demold the frame profile with the retaining strips following the injection-molding operation with the retaining-strip profile section located above the retaining grooves being elastically deformed in the process. This means that the retaining force for securing the retaining clips is also limited.

In order to achieve greater groove depth, the injection mold would have to operate with slide bars. This would result in very complex and expensive injection molds. Moreover, this would result in the problem of the slide bars having to be sealed very well in order that the comparatively low-viscosity material of the frame, during the injection-molding operation, does not penetrate into the interspaces between the slide bar and the slide-bar guide and makes the guide sluggish and, after a short period of time, even unusable. A further disadvantage of the slide bars would also be that the slide bars would have to be designed to be very small in comparison with the injection mold itself. This would mean that they would be very susceptible to malfunctioning.

With injection molds which operate without slide bars, it is possible to achieve groove depths which, if PVC is used as the frame material, result in retaining forces for the retaining clips, and thus for the add-on parts, which are just sufficient. If, for example, thermoplastic elastomers (TPE) are used as the frame material, the profile of the retaining strips is too compliant in order to produce a sufficient retaining force for the retaining clips. This means that the add-on parts may drop off even in the event of slight contact. If this happens a number of times and the retaining clips have to be repositioned on the retaining strips again and again, the profile section of the retaining strips against which the retaining section of the retaining wings of the retaining clips butt is subjected to wear to such a pronounced extent that the retaining clip is no longer secured at all.

The object of the invention is to provide a window unit, with an integrally formed frame and with retaining devices for an add-on part, in which the frame can be produced from a comparatively compliant material and a sufficient retaining force for the add-on part is nevertheless achieved. This object is achieved by a window unit having the features specified in claim 1.

Since each retaining strip is formed by an insert body, on which the frame is integrally formed in the injection mold as it is on the window, and since the material of the insert bodies is of a higher strength than the material of the frame, it is possible to achieve sufficient retaining forces for the add-on part even with a comparatively compliant frame material.

Since the insert bodies are prefabricated as individual parts in a dedicated injection mold, in which the operation of demolding can be carried out differently than that in the injection mold for the frame, the retaining grooves may be produced with a greater groove depth than has otherwise been the case, which, in conjunction with the higher dimensional stability of the material of the insert bodies, increases the retaining force for the retaining clip and thus for the add-on part.

By virtue of the configuration according to claim 2, the insert bodies, on the one hand, have a high dimensional stability and, on the other hand, undergo good bonding with a TPE frame material.

By virtue of the configuration according to claim 3, the underside of the insert body is kept at a certain distance from the window, with the result that the frame material can also penetrate inbetween the underside of the insert body and the window and can thus bond the insert body to the window to even better effect.

By virtue of the configuration according to claim 4, the insert body can be positioned very precisely in the injection mold for the frame and fixed for the injection-molding operation of the frame. Moreover, the positioning stubs or positioning strips may serve as spacer elements in relation to the window. In a development according to claim 5, those parts of the positioning stubs or positioning strips which project beyond the outline of the frame can easily be removed once the window unit [sic] has been demolded, with the result that they do not cause any disruption when the window unit is mounted at the envisaged use location.

By virtue of the configuration according to claim 6, the retaining clips can be positioned and fixed very well on the retaining strips. A development according to claim 7 makes it easier for the retaining clips to be pushed onto the retaining strips.

The invention is explained in more detail hereinbelow with reference to an exemplary embodiment illustrated in the drawing, in which:

FIGS. 3 and 4 show a view, illustrated in detail form, of a frame section with a retaining device for the add-on part in different installation stages;

FIGS. 5 to 7 respectively show an end view, a side view and a plan view of a retaining clip for the retaining device according to FIG. 3;

FIGS. 8 to 10 respectively show an end view, a side view and a plan view of an insert body for the retaining device according to FIG. 3.

Figure 1:
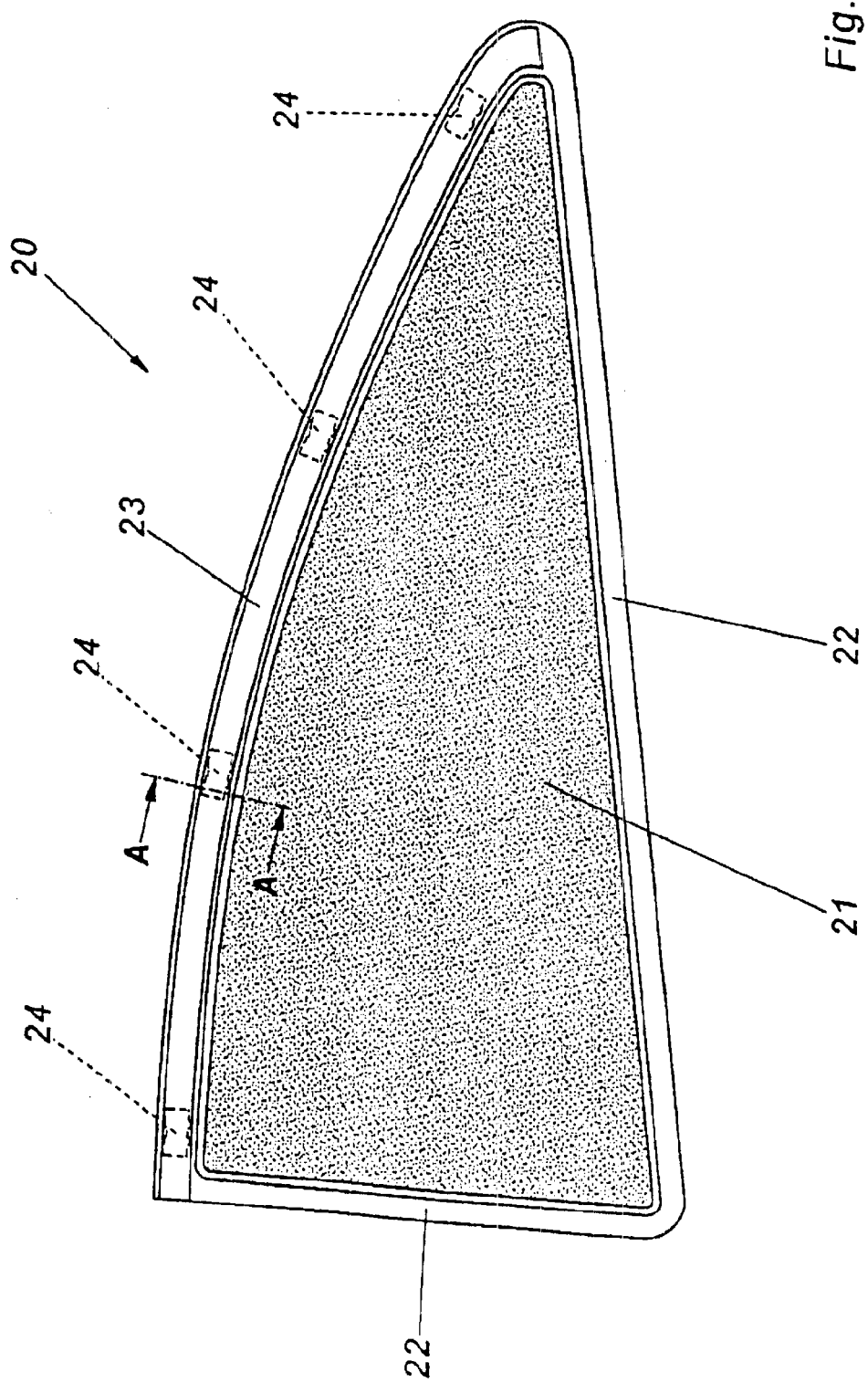
FIG. 1 shows a view of a window unit comprising a window and frame with an add-on part and retaining devices for the same.

FIG. 1 shows a window unit 20 which is formed by a window 21 made of silicate glass or of synthetic resin glass, and from an annularly continuous frame 22 which encloses the border of the window 21 on three sides. The frame 22 is made of a thermoplastic elastomer (TPE) and is integrally formed on the window 21 as an injection molding. Arranged on the top frame section is an add-on part 23 which is in the form of a trim strip and is retained by four retaining devices 24, which are connected to the frame 22.

Figure 2:
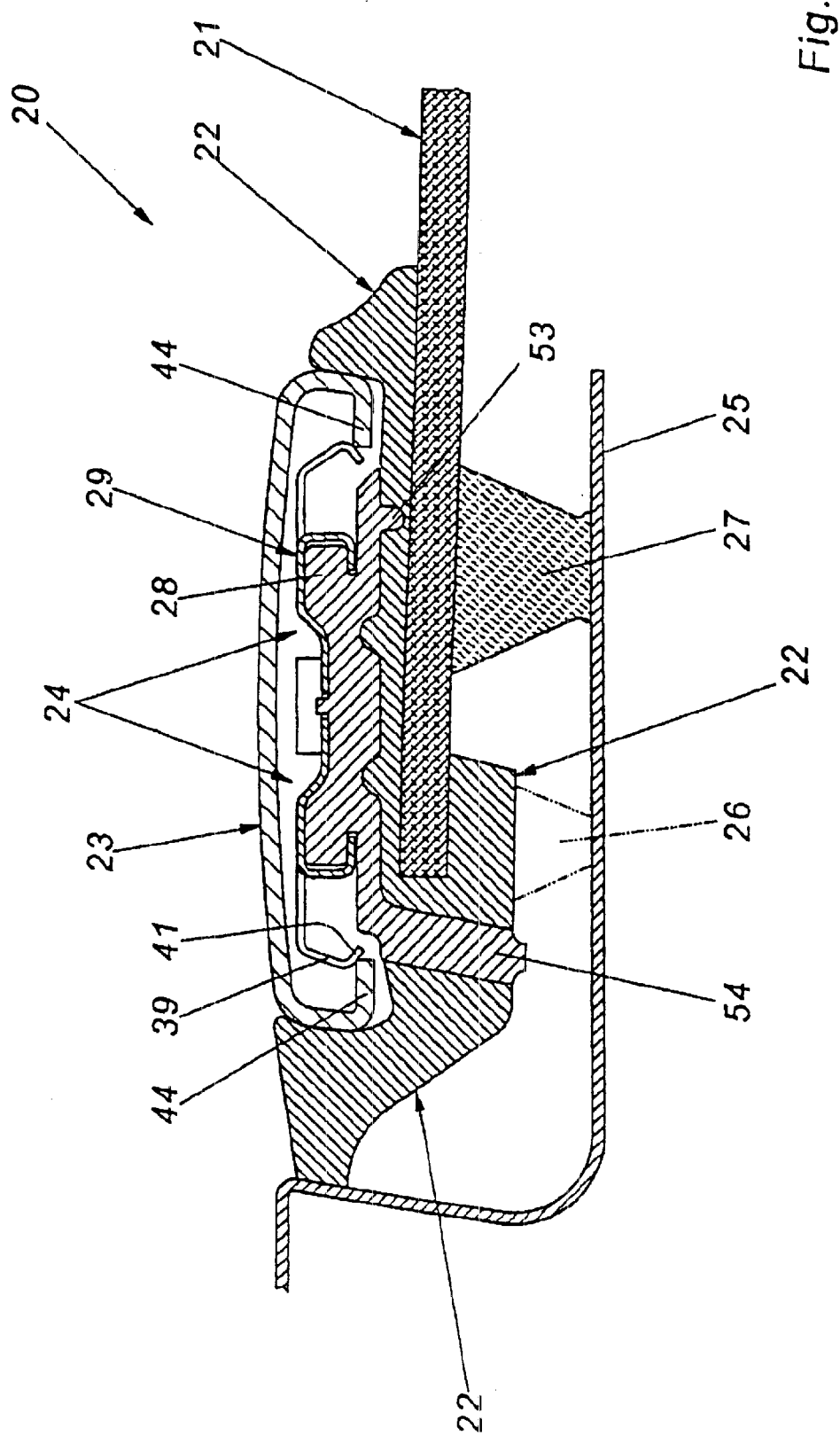
FIG. 2 shows a cross section, illustrated in detail form, of the window unit with add-on part mounted in a bodywork opening.

The window unit 20 is inserted in the region of a predefined opening of a bodywork part 25 (FIG. 2). Provided on the frame 22 are spacers 26, which are indicated by chain-dotted lines and ensure that the glass window 21 is at a predefined distance from the bodywork part 25. The window unit 20 is permanently bonded to the bodywork part 25 by means of an application of adhesive 27.

A retaining device 24 is formed by a retaining strip 28 and a retaining clip 29. The retaining strip 28 is permanently bonded to the frame 22 (FIG. 2 and FIG. 3). The retaining clip 29 is releasably connected to the retaining strip 28 and anchored thereon by a form fit (FIG. 2 and FIG. 4).

The retaining clip 29 is produced from a sheet-metal blank. It has an elongate basic body 31 (FIG. 7). Arranged on its two longitudinal borders are three retaining wings 32 and two latching wings 33, which alternate with one another in the longitudinal direction of the basic body 31.

The retaining wings 33 have three adjoining length sections, which are referred to as rear section 34, side section 35 and retaining section 36. The rear section 34 is aligned outward and extends from the basic body 31 to an outer edge 37. The side section is aligned at least more or less normal to the outer surface of the frame 22 and extends in the direction of the frame 22 (FIG. 2). The retaining section 36 is aligned inward and runs virtually parallel to the rear section 34. The retaining section 36 is shorter than the rear section 34.

The latching wings 33 likewise have three adjoining length sections, which are referred to as rear section 38, ramp section 39 and latching section 41. The rear section 38 is aligned outward and extends beyond the horizontal projection of the outer edge 37 of the retaining wings 32 to the transition location to the ramp section 39. The ramp section 39 extends from the transition location 42 to an outer edge 43 and is inclined downward in relation to the rear section 38. The latching section 41 extends inward again from the outer edge 43, and is likewise inclined downward.

This configuration of the latching wings makes it easier to position the add-on part 23 in that inwardly directed border sections 44 of the add-on part 23 (FIG. 2) slide along the ramp surfaces 39, the border sections 44 being pressed elastically outward and the add-on part 23 being spread open elastically. As soon as the border sections 44 have slid beyond the outer edges 43, they spring back and position themselves against the latching section 41 of the latching wings 33 and thus secure the add-on part 23 on the retaining clip 28.

The retaining strip 28, for securing the retaining clip 29, is not integrally formed directly on the frame 22. Rather, it is formed by a profile section of an insert body 45, on which the frame 22 is integrally formed when it is also integrally formed on the window 21.

The insert body 45 is a plastic molding, e.g. made of polypropylene (PP). It thus has a greater dimensional stability than the material of the frame 22. The PP of the insert part 45 undergoes good bonding with the TPE of the frame 22, with the result that the insert body 45, and thus also the retaining strip 28 at the same time, is permanently bonded to the frame 22.

The retaining strip 28 is of an elongate configuration (FIG. 10), of which the length is at least more or less equal to the length of the retaining clips 29. In the region of its two longitudinal borders, the retaining strip 28 has a vertical projection which is coordinated with the clear vertical profile of the retaining wings 22 of the retaining clips 29. Accordingly, on its two longitudinal borders, the retaining strip 28 has in each case one profile section 46, and the rear section 34 of the retaining wings 32 rests on the top side 47 of said profile section 46. A retaining groove 48 is arranged on the retaining strip 28 at a distance, from the top side 47, which is at least more or less equal to the clear distance of the retaining section 36 from the rear section 34 of the retaining wings 32, and said retaining groove is coordinated with the retaining section 36 of the retaining wings 32.

In the longitudinal direction of the retaining strip 28, the profile sections 46 are interrupted by two recesses 49 in those length regions in which the latching wings 33 are located on the retaining clips 29. These interruptions make it easier for the retaining clip 29 to be pushed onto the retaining strip 28.

As can be seen, in particular, from FIG. 8 and FIG. 10, the insert body 45 has, beneath the retaining strip 24 [sic], a base plate 51, which is produced integrally with the retaining strip 24 [sic]. The base plate 51 is slightly longer, and wider on both sides, than the retaining strip 28.

Two spacer strips 53 are arranged at a distance apart in the longitudinal direction along that longitudinal border of the base plate 51 which is directed toward the window 21, on the underside 52 of said base plate 51. Said spacer strips are intended for keeping the underside 52 of the base plate 51 at a certain distance above the top side of the window 21 (FIG. 2), in order that the material of the frame 22, when it is integrally formed on the window 21, can also pass onto the underside of the base plate 51 and can bond the base plate 51 to the window 21. The distance of the spacer strips 53 apart from one another means that the insert body 45 can also be inserted in the case of curved windows.

Two positioning strips 54 are arranged on that longitudinal border of the base plate 51 which is remote from the window 22 [sic]. Their horizontal projection is located a certain distance outside the horizontal projection of the window 21 (FIG. 2), in order that the material of the frame 22 can also penetrate into the interspace between the outer border of the window 21 and the positioning strips 54 and the frame material is thus also bonded to the inside of the positioning strips. The positioning strips 54 are of such a length that at least an end section 55 projects beyond the outline of the frame 22. This end section 55 is intended for being inserted into coordinated positioning holes of the injection mold for the frame 22, in order thus to position the insert body 45 at the correct location of the injection mold and to position the retaining strip 28 at the correct location of the future frame 22. The positioninging strips 54 serve, at the same time, as spacers which, even at that border region of the window 21 which is remote from the spacer elements 53, retain the insert body 45 at a distance away from the window 21 which is sufficient for the penetration of the frame material.

In the region of the outline of the frame 22, the positioning strips 54 are provided with a break-off groove 56 in each case on both sides. Following demolding of the window 21 and of the frame 22 with the insert bodies 45, the end sections 55 of the positioning strips 54 are broken off along the break-off grooves 56 (FIG. 2).

As can be seen from FIG. 8, there is provided on the top side of the retaining strip 28 a hollow 57 which extends over the entire length of the retaining strip 28. Two short stop ribs 59 are provided on the planar base 58 of the hollow 57, on the longitudinal center line of the retaining strip 28 (FIG. 10).

The basic body 31 of the retaining clips 29 is adapted to the outline of the retaining strip 28 and is more or less in the form of a tray which is open on the end sides and is coordinated with the hollow 57 of the retaining strips 28. Provided in the basic body 31 of the retaining clips 29, in the horizontal-projection region of the stop ribs 59, is in each case one through-passage hole 61, of which the diameter is coordinated with the shape, in horizontal projection, of the stop ribs 59. Conversely, the two end sides of the stop ribs 59 are also coordinated with the border of the through-passage holes 61, i.e. are rounded in circle-arc form. Moreover, the end-side edges of the stop ribs 59 are beveled.

The basic body 31 is adjoined, on the two transverse borders of the retaining clips 29, by in each case one beveled ramp surface or rounded runner surface 62 (FIG. 6), of which the height is at least equal to the height of the spacer ribs 59 on the retaining strip 28. When a retaining clip 29 is pushed onto a retaining strip 28, the runner surfaces 62 ensure that the basic body 31 of the retaining clip 29 is raised elastically when the runner surface 62 strikes against the nearest stop rib 59. As soon as the through-passage holes 61 of the basic body 31 are vertically aligned with the stop rib 59, the basic body 31 snaps back elastically again and the border of its through-passage hole 61 positions itself against two end sides of the stop rib 59 and thus anchors the retaining clip 29 on the stop [sic] strip 28 (FIG. 4).

The upwardly projecting border of the runner surface 62 provides, at the same time, a grip in order that the retaining clip 29 can be pushed more easily onto the retaining strip 28.

What is claimed is:

1. Window unit for inserting into a predefined opening of motor vehicles and such like, comprising:
   a window made of silicate glass or of a synthetic resin glass,
   a frame
      which at least partially surrounds the window,
      which is injection molded, and
      which is integrally formed on a border of the window on at least one side,
   a retaining device arranged on at least two peripheral sections of the frame for retaining add-on parts,
      each retaining device comprising:
         a retaining strip which is arranged on the outside of the frame and which is permanently bonded thereto, and
         a retaining clip which is releasably connected to the retaining strip, wherein
   each retaining clip has an elongate basic body, of which two remote longitudinal borders are adjoined
      by at least in each case one retaining wing, and
      by at least in each case one latching wing,
   the retaining wing having at least three adjoining length sections,
      wherein a first extends from the basic body to an outer edge of the retaining wing,
      wherein a second is essentially normal to the outer surface of the frame and extends in a direction of the frame, and
      wherein a third is a retaining section,
   the latching wings have, for a latching an add-on part, profile sections which are located beyond the outer edge of the retaining wing,
   on two remote sides, which run parallel to the frame section, each retaining strip has in each case one retaining groove which is coordinated with the retaining section of the retaining wing,
   each retaining strip is formed by a profile section of a prefabricated insert body
   which is a plastic molding,
      of a material having a higher strength than a material of the frame, and
      of which the material, when the frame is integrally formed on the window and on the insert body, at least one of:
         adheres well with the material of the frame, and
         undergoes permanent bonding thereto.

2. Window unit according to claim 1, wherein:
the insert bodies are produced from polypropylene.

3. Window unit according to claim 1, wherein:
on its underside, the insert body has spacer elements comprising spacer protrusions, and wherein:
   at least two spacer protrusions are arranged at a distance apart along the insert body adjacent to the window.

4. Window unit according to claim 1, wherein:
the insert body has two positioning members
   which are arranged along a border of the insert body which is remote from the window,
   which project beyond an outline of the frame, and
   which are coordinated with positioning holes in the frame.

5. Window unit according to claim 4, wherein:
the positioning member comprises:
   positioning stubs which are provided with an encircling break-off groove in the region of the outline of the frame, and
   positioning strips which are provided with a break-off groove in the region of the outline of the frame on at least one side, preferably on both sides.

6. Window unit according to claim 1, wherein:
the basic body of the retaining clip has a tray-like projection,
the basic body of the retaining clip has two spaced through-passage holes,
a top side of the retaining strip and an underside of the basic body of the retaining clip are coordinated with one another,
a top side of the retaining strip has stop members which interact with a border of the basic body of the retaining clip.

7. Window unit according to claim 6, wherein:
the border of the basic body of the retaining clip has a surface which is at least equal in height to a height of the stop member.

* * * * *